Nov. 28, 1939.   P. M. BOURDON   2,181,475
CABLE
Filed Oct. 16, 1937
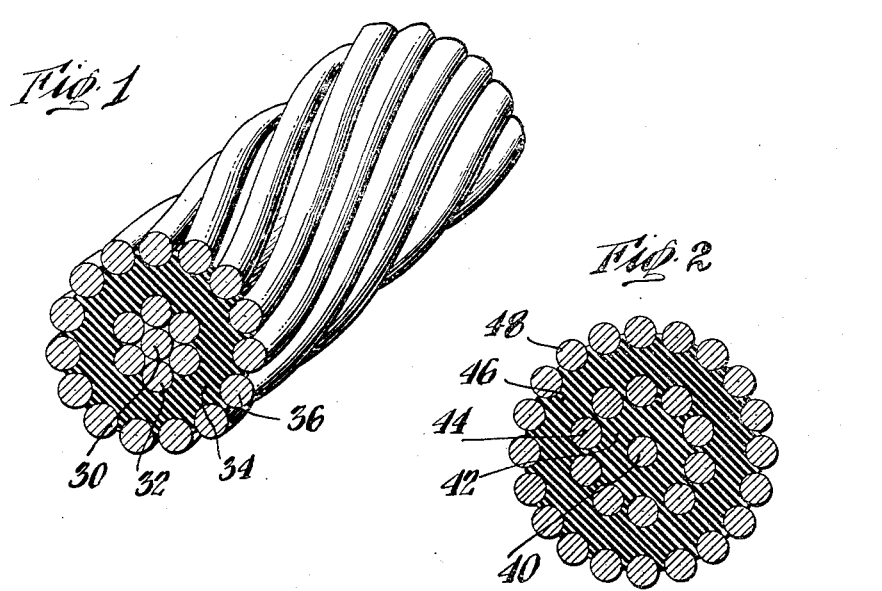
INVENTOR
Pierre Marcel Bourdon
BY
ATTORNEYS Patented Nov. 28, 1939

2,181,475

UNITED STATES PATENT OFFICE

2,181,475

CABLE

Pierre Marcel Bourdon, Paris, France, assignor to Michelin et Cie, Clermont-Ferrand, France, a corporation of France Application October 16, 1937, Serial No. 169,376
In France October 26, 1936

2 Claims. (Cl. 245—1.5)

This invention relates to improvements in cables which are particularly adapted for use in the manufacture of pneumatic tire casings and for reinforcing the plies and beads thereof.

Cables which are used as bead wires and as reinforcements in the plies of pneumatic tires are ordinarily manufactured by winding a plurality of wire filaments in helical formation about a center core filament. The diameter and the strength of such cables are varied by varying the diameter of the filaments and the number of layers of filaments wound about the center core filament. Usually successive layers of filaments are wound helically in opposite directions. This type of construction produces spaces of comparatively great area between the various layers of filaments or wires, particularly when round wires are used. When such a cable is embedded in a layer of rubber, as in the manufacture of a ply or in the formation of a bead, rubber is forced into the interstices between the wires and the various layers of the cables. However, due to the comparatively great size of the interstices, they are practically never completely filled by the rubber and as a consequence air-containing voids are left therein. The presence of the voids or air pockets prevents uniform adhesion between the rubber and the cable upon vulcanization, and also allows water vapor to accumulate in these pockets. The water vapor tends to corrode the wires and upon continued usage will so weaken them that they will break, separate, and tend to puncture the casing of the tire.

Another disadvantage of the conventional cable construction is that it is relatively inflexible and as a result materially reduces the flexibility of the tire ply and the completed casing. In addition to the reduction in flexibility, the close contact or rubbing engagement between the filaments in each layer and the filaments of adjacent layers causes excessive wear and likewise places the cable under varying tensions. That is, the wires or filaments on the outermost surface of a bent or flexed cable will be stretched while the filaments on the inner surface of the cable will be compressed. Since the cables are bent many times a minute during operation of the tire, it will be seen that the repeated bending of the cable and the exertion of tensile and compressive stresses will cause quick failure of the cables. Also, during the formation of a tire casing, the cables are bent and the successive layers of wire tend to twist with respect to each other and to the core. Some of the wires will be tightened around the core, while others will be loosened, thereby unequally stressing the wires. This lack of uniform stress causes some of the wires to fail more quickly than others.

The principal object of the present invention is to produce a cable which is far more flexible than the type of cable now produced and in which frictional engagement between the various filaments in the cable is reduced to a minimum.

Another object of the invention is to produce a cable in which each of the filaments is supported in cushioned relation to each of the other filaments, whereby variations in tensile and compressive stresses on the filaments are largely avoided.

A still further object of the invention is to produce a cable which will bond more firmly to the rubber of the plies or the tire casing, and which contains no voids capable of accumulating water vapor or air.

A typical form of the invention may suitably consist of a cable formed with a center core filament which is embedded in a layer of raw or unvulcanized rubber, about which is wound one or more layers of helically wound filaments. Each of the layers of filaments may be separated from a successively outwardly disposed layer by an interposed cushioning layer of unvulcanized rubber. Cables of this type, when formed into plies or used as individual reinforcing elements or bead wires, will bond firmly to the other rubber portions of the tire. Upon vulcanization the rubber in the cables will flow between the filaments to completely fuse or bond with the rubber of the tire and upon curing will form a homogenous portion of the tire without creating abnormal tension along the filaments and will largely prevent rubbing engagement between the filaments. The cushioning effect of the rubber allows the filaments and the successive layers of filaments to twist with respect to each other and move longitudinally under only slight stress.

In the completed tire, the layers of filaments of the cables are thus separated by a layer of elastic vulcanized rubber which completely fills the interstices between the filaments and cushions and prevents rubbing of the filaments. The intimate engagement of the rubber with the filaments prevents accumulation of moisture and air and practically eliminates corrosion. The cushion of rubber also tends to equalize the stresses on the filaments throughout their length and distributes the stresses equally to the various filaments. Distribution of stresses prevents overloading of some of the filaments which would cause them to fail before the other filaments which are loaded to a lesser extent. The rubber also suppresses rubbing of the successive layers of filaments one on the other, which has been found to be a cause of wear on the filaments, therefore weakening the cable in service, even though rubbing of the filaments in the same layer may be very slight.

For a better understanding of the present invention, reference may be had to the accompanying drawing, in which:

Figure 1 is a perspective view of a portion of a cable produced in accordance with my invention; and Figure 2 is a cross-sectional view of a modified form of cable produced in accordance with my invention.

In Figure 1 there is illustrated one form of cable embodying my invention. This cable may consist of a center core wire 30 about which is wrapped in helical formation a plurality of filaments 32. This inner cable section may be coated with a layer of unvulcanized or raw rubber 34 to produce a cushion layer about which is wrapped a second layer 36 consisting of a plurality of filaments wrapped in a direction counter to the winding of layer 32. The layer of rubber 34 acts to cushion movements of the filaments forming the layer 36 and allows them to move toward and from the core 30 without undue restraint. Thus, upon bending the cable, the filaments in layer 36 may move toward or away from the center core filament 30 against only the cushioning resilience of the rubber. This relative movement reduces and equalizes the tensile and compressive stresses in the individual filaments. Likewise, the wires may move longitudinally with respect to each other and without friction between the individual filaments or successive layers of filaments, thereby reducing internal heat and wear upon the individual filaments.

Figure 2 illustrates another embodiment of the invention in which the center core filament 40 is coated with a layer of raw or unvulcanized rubber 42 and a plurality of filaments wrapped helically about the coated filament to form a layer 44. The partially completed cable may then be coated with an additional layer of raw or unvulcanized rubber 46 and an additional layer 48 of filaments wound thereabout in a direction counter to the winding of layer 44. This construction produces a highly flexible cable in which each layer is cushioned by rubber and separated from every other layer and each filament is substantially coated with a layer of unvulcanized rubber. As in the case of the cable disclosed in Figure 1, internal friction is reduced, thus reducing wear and generation of heat in the cable and the individual filaments are relieved of tensile and compressive stresses.

Each of the cables embodying the invention, due to its uniformly coated condition, is free of voids in which moisture or air can accumulate. Also, upon vulcanization, the rubber between the layers of filaments bonds homogenously with the rubber of the tire and acts, in effect, to vulcanize each of the filaments to the casing of the tire. Thus while the filaments are inserted in the ply or in the casing as a composite group forming a cable, each filament is allowed to act independently of all the other filaments, and therefore is less susceptible to breakage than the filaments of ordinary cables.

It will be understood that the number of layers of filaments in the cables may be varied as desired, and that the number and size of the filaments in each layer may likewise be suitably varied. If desired, a plurality of fine filaments, for example, two or three, may be twisted to form a core which is more flexible than a solid core filament of equal diameter. The embodiments disclosed in the drawing should therefore be considered as illustrative only, and not as limiting the scope of the following claims.

I claim:

1. In a bead cable for a tire casing the combination of a metallic core filament, a plurality of metallic filaments wound helically around the core member in one direction to form a first layer, a plurality of metallic filaments wound helically around the first layer in another direction to form a second layer, and unvulcanized rubber interposed between the first and second layers, said rubber yieldingly supporting said filaments for independent relative rotational movement and axial shifting movement while the bead cable is being incorporated into said tire casing and for equalizing the initial stresses in the filaments lengthwise and distributing the stresses among the various filaments during incorporation of the bead cable into the casing, and thereafter bonding the filaments to the casing upon vulcanization.

2. The bead cable set forth in claim 1 comprising unvulcanized rubber interposed between said core filament and said first layer.

PIERRE MARCEL BOURDON.